Figures 4, 5:
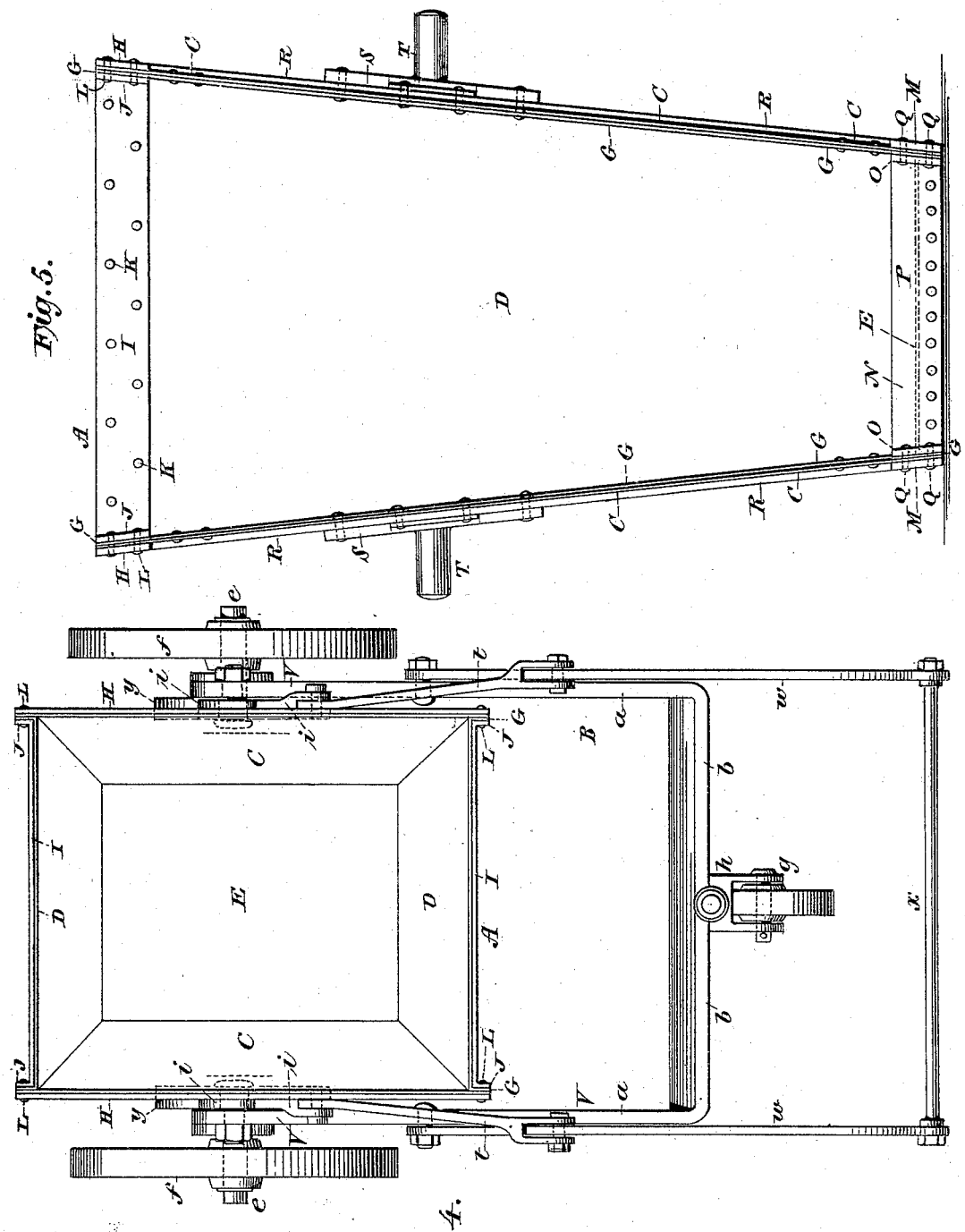

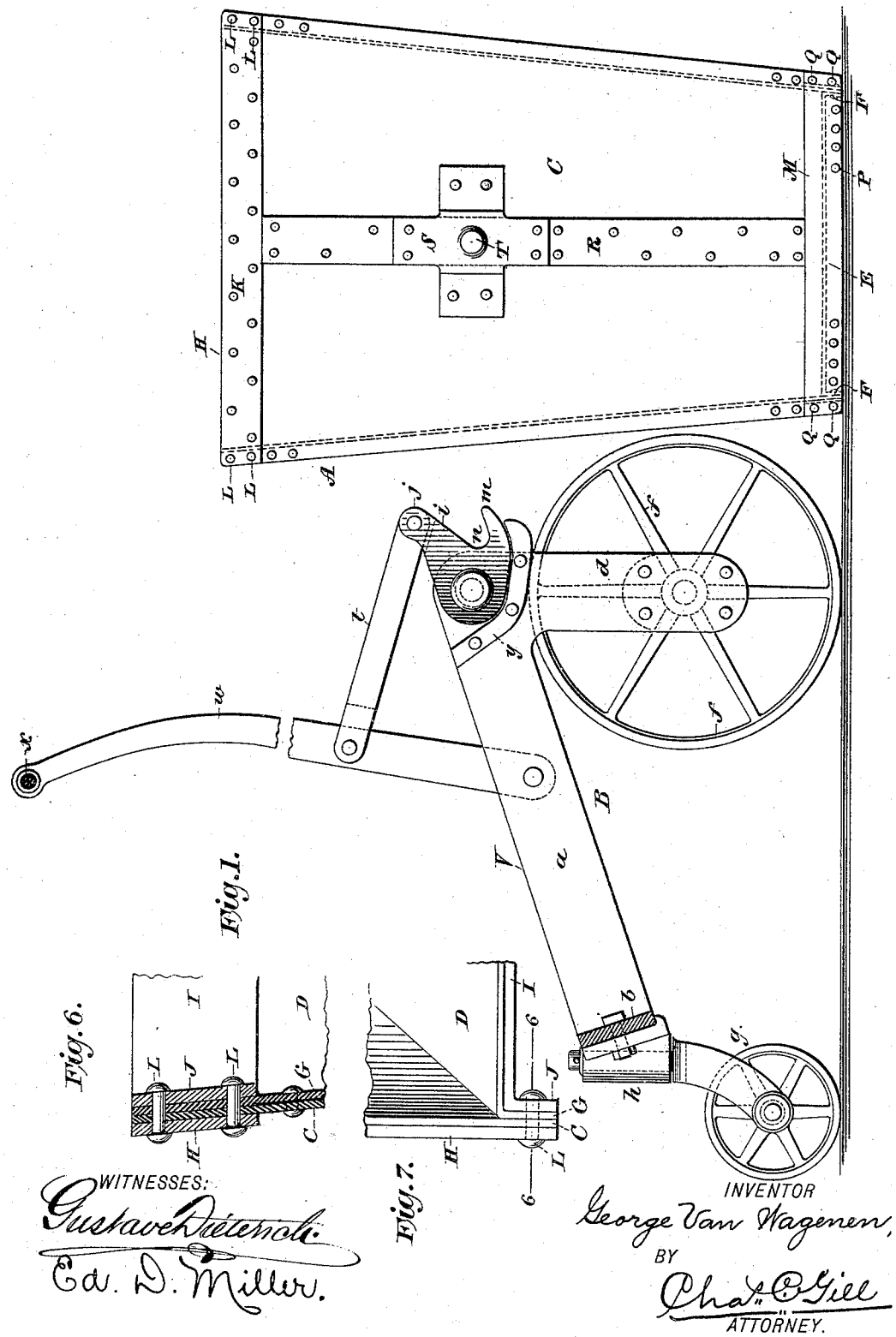

(No Model.) 3 Sheets—Sheet 2.
G. VAN WAGENEN.
SUGAR WAGON.
No. 493,950. Patented Mar. 21, 1893.
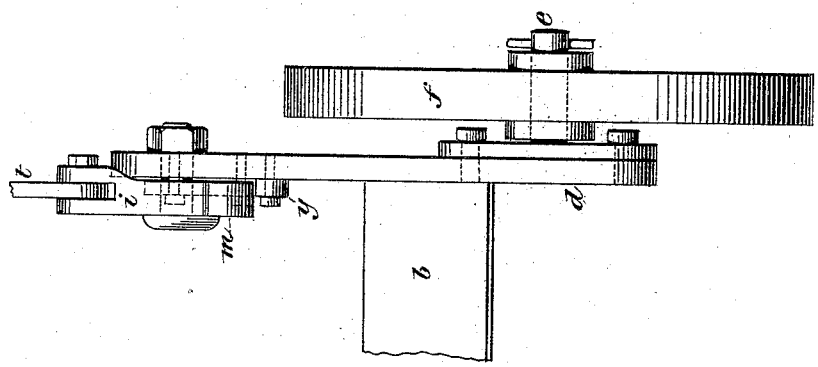
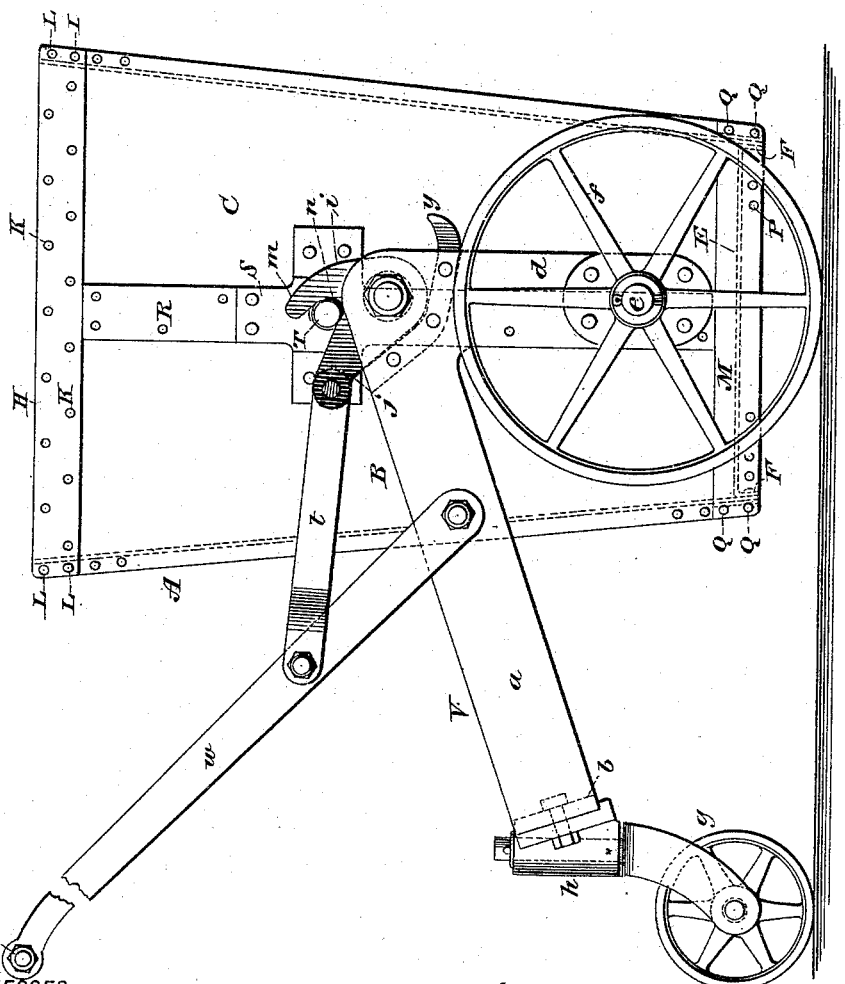
WITNESSES:
Gustave Dietrich.
Ed. D. Miller.
INVENTOR
George Van Wagenen,
BY
Chas. O. Gill
ATTORNEY.

(No Model.) 3 Sheets—Sheet 3.

G. VAN WAGENEN.
SUGAR WAGON.

No. 493,950. Patented Mar. 21, 1893.

WITNESSES:
Gustave Dieterich
Ed. D. Miller.

INVENTOR
George Van Wagenen,
BY
Chas. O. Gill
ATTORNEY.

UNITED STATES PATENT OFFICE.

GEORGE VAN WAGENEN, OF NEW YORK, N. Y.

SUGAR-WAGON.

SPECIFICATION forming part of Letters Patent No. 493,950, dated March 21, 1893.

Application filed November 28, 1892. Serial No. 453,344. (No model.)

*To all whom it may concern:*

Be it known that I, GEORGE VAN WAGENEN, a citizen of the United States, and a resident of New York, in the county of New York and State of New York, have invented certain new and useful Improvements in Sugar-Wagons, of which the following is a specification.

The invention relates to improvements in sugar wagons, and consists in certain features of novelty pertaining to the body and truck of the wagon, as hereinafter described and claimed.

The present invention relates to the general class of sugar wagons referred to in Letters Patent of the United States numbered 441,264, granted to George Van Wagenen November 25, 1890. In the patent referred to it will be observed that the wagon body consists of a sheet steel box or receptacle mounted on wheels whose axles are rigidly secured to said body. The sugar is placed in the box or receptacle while hot and there allowed to cool, after which the wagon is reversed in position and the sugar dumped therefrom. The wheels permit the convenient transfer of the box or receptacle containing its load of sugar from place to place as desired. In accordance with the present invention the box or receptacle is flanged at its corners and strengthened by bands at its upper and lower ends and provided on opposite sides with trunnions the latter serving to support the box or receptacle on a truck which is adapted to be applied to and removed from the box or receptacle at will. The truck is of novel construction and consists of a frame supported by wheels and open at one end to receive or pass upon opposite sides of the box or receptacle while resting on the floor or ground, and said frame is provided at opposite sides with pivotally mounted bearing claws connected with hand levers and adapted under the action of said levers to engage said trunnions and lift the said box or receptacle into position to form the body of the wagon. The arrangement of the bearing-claws and levers is such that after the box or receptacle is lifted into position no physical force is required to there maintain it, and the levers may be used as handles by which to move the wagon to the point at which it may be desired to cool or dump the sugar. Upon reversing the movement of the said bearing claws and levers, the box or receptacle may be conveniently lowered to the ground and its trunnions disengaged from the truck, whereupon the latter may be withdrawn leaving the box or receptacle entirely free. The one truck may thus be employed in connection with a number of the boxes or receptacles if desired, and it will be understood that an injury to the box would not result in disabling the entire wagon. In accordance with the present invention, the wheels of the truck may be much larger than those shown in the said patent numbered 441,264, and hence the load of sugar may be moved with great ease and facility.

The removable box or receptacle and the truck made according to the invention, which is the subject hereof, are of great strength and durability, and the details of their construction will be more fully understood from the description hereinafter presented.

Referring to the accompanying drawings, Figure 1 is a central vertical longitudinal section of the truck shown in position to be moved upon opposite sides of the box or receptacle, the latter being in side elevation in position to be lifted and moved by the truck. Fig. 2 is a side elevation of same shown in position supporting the box or receptacle. Fig. 3 is a detached front end view on an enlarged scale, of one side of the truck. Fig. 4 is a top view of the truck and receptacle or box, the latter being supported in position between the sides of the truck. Fig. 5 is an end elevation on an enlarged scale of the box or receptacle. Fig. 6 is an enlarged vertical section through one corner of the box or receptacle, the section being on the dotted line 6—6 of Fig. 7, which is an enlarged top view of a detached corner of the receptacle.

In the drawings A designates the box or receptacle, and B the truck which is intended to support and convey the same. The box or receptacle A consists of the tapered sides C, C, ends D, D, and bottom E, the latter having around its edges the downwardly extending flange F, as indicated by dotted lines in Figs. 1 and 2. The sides C, C, and ends D, D, are of suitable width and taper downward and inward to the flange F encompassing the bottom E, to which flange the said sides and ends are firmly riveted. The ends D, D, of the receptacle A have at their vertical edges the outwardly extending flanges G, as seen more clearly in Figs. 4 and 7, and to these flanges are riveted the extreme opposite edges of the sides C, C, of the receptacle. It will thus be observed that although the sides and ends C, D, are riveted to each other and to the bottom E none of the rivets show within the receptacle, the latter being thus left smooth and seamless. The opposite ends of the sides C, C, extend beyond the inner plane of the ends D, D, and thus form flanges which match the flanges G on the said ends D.

Around the upper edge of the receptacle or box A are secured the bands H, I, the former being plain pieces of metal extending along the sides C, C, while the bands I have at their opposite ends the outwardly turned flanges J bearing closely against the outer surfaces of the flanges G formed on the ends D. The bands H, I, are secured to the sides C and ends D, by rivets K and also by the rivets L, the latter extending through the flanges J, G, the edges of the sides C and ends of the bands H, as illustrated in Figs. 4 and 7.

The lower edges of the box or receptacle A are provided with the bands M, N, the bands M being plain pieces of metal extending along the sides C, C, while the bands N have at their outer ends the outwardly turned flanges O fitting closely against the outer edges of the flanges G formed on the ends D. The bands M, N, are rigidly secured to the lower end of the receptacle or box by means of the line of rivets P and also by the rivets Q, which, as shown, pass through the flanges O, flanges G, sides C and ends of the band M. Upon opposite sides of the receptacle or box A are the vertical metallic bands R, which are riveted to the sides C, C, and extend from the lower edges of the bands H to the upper edges of the bands M, and upon the bands R at a suitable point above the horizontal center of the box or receptacle are secured by means of the plates S the trunnions T, the latter being of suitable dimensions to afford a proper support for the box or receptacle when the latter is being conveyed by means of the truck B. The plates S, as illustrated in Figs. 1 and 2, extend upward and downward and to right and left from the trunnions T and are firmly riveted to the bands R and the sides of the box A. The horizontal extensions of the plates S are bent inward to conform to the vertical side edges of the bands R and hence the plates S will closely bear throughout their entire inner surfaces against the bands R and adjacent portion of the sides C, C. The object of providing the plates S of the form shown and described is to afford a very strong and reliable support for the trunnions T, and one capable of resisting great strain without danger of injury to the sides of the box or receptacle.

The sides, ends and bottom of the box or receptacle A will be made of sheet steel riveted together at their edges, as described above, and strengthened by the bands H, I, M, N, and R, and this box or receptacle thus constructed is intended to receive the sugar while hot, and by means of the truck B, convey it to the proper location where it will be allowed to cool and then dumped in the usual manner.

The truck B is composed of the body V which will be of metal and consist of the opposite sides $a$, $a$, end $b$ and downwardly projecting arms $d$, which carry on their outer faces the axles $e$ for supporting the conveying wheels $f$, the latter being of any usual construction. As will be seen in Figs. 1 and 2, the sides $a$ incline downward to the end $b$, which is supported at its middle portion by means of the swivel $g$, the latter being of usual construction and having its vertical stem mounted in the casting $h$ which is bolted to the end $b$. At the inner sides of the front open end of the truck B are pivotally mounted the bearing-claws $i$ having the arms $j$ and fingers $m$, between which arms and fingers are formed the pockets $n$ of a size adapted to receive the trunnions T connected with the opposite sides of the box or receptacle A. The upper ends of the arms $j$ are pivotally secured to the links $t$ which connect said arms with the sides of the operating levers $w$, the latter being pivotally secured at their lower ends to the sides $a$ of the truck and at their upper ends being connected by the handle-rod or bar $x$. Below the claws $i$ are rigidly secured to the inner sides of the truck B the stops $y$ which consists of suitably bent pieces of metal riveted to the sides $a$. As illustrated in Figs. 1 and 2 the stops $y$ afford rest for the claws $i$ whether the latter are in position to grasp the trunnions T or have already engaged the same and lifted the box or receptacle to the position shown in Fig. 2. It will be observed upon reference to Figs. 1 and 2 that said arms or levers $w$ have a hinged movement on the rivets securing them to the sides $a$, and that when said levers $w$ are turned upward, as indicated in Fig. 1, the links $t$ will move the arms $j$ forward, thus lowering the fingers $m$ and pockets $n$ to a position in which upon the truck being moved on opposite sides of the receptacle, they will pass beneath the trunnions T. After the fingers $m$ and pockets $n$ have moved beneath the trunnions T, the levers $w$ will be pulled rearward and downward to the position indicated in Fig. 2, thus through the links $t$ and arms $j$ elevating the fingers $m$ and pockets $n$ against and lifting thereby the trunnions T, the effect being to elevate the receptacle or box A clear of the ground and bring the center of the trunnions T to the rear of the vertical line of center of the bolts securing the claws $i$. The weight of the box or receptacle A will thus have no tendency to return to its former position, its entire weight being supported by the claws $i$ and stops $y$, and thus when in the position stated, the said box or receptacle with its contents may be conveniently moved to any desired position.

When it is desired to release the box or receptacle A from the truck B it will only be necessary to elevate the levers $w$, when through the links $t$ the claws $i$ will gradually be turned to their former position and the box or receptacle will be lowered to the ground, after which the truck may be backed from the opposite sides of the receptacle and used to convey other of the boxes or receptacles from the point at which they are filled to the location at which their contents are to be cooled or dumped.

What I claim as my invention, and desire to secure by Letters Patent, is—

1. The three sided truck frame mounted on wheels and open at one end to pass upon opposite sides of the box or receptacle, combined with the bearing claws pivoted on opposite sides of said frame, and the levers pivoted at their lower ends to said frame, and the links intermediate said levers and said claws, substantially as and for the purposes set forth.

2. The three sided truck frame having the wheels $f\,f$ and swivel $g$ and being open at one end to pass upon opposite sides of the box or receptacle, combined with the bearing claws pivoted upon opposite sides of said frame and having the arms $j$ and fingers $m$, the levers pivoted at their lower ends to said frame, and the links intermediate said levers and said arms $j$; substantially as set forth.

3. The box or receptacle having the trunnions on opposite sides, combined with the truck open at one end to pass on opposite sides of said box or receptacle, movable bearings to engage said trunnions and lift said box or receptacle, and the levers connected with and adapted to move said bearings; substantially as and for the purposes set forth.

4. The three sided truck frame mounted on wheels and adapted to pass on opposite sides of the box or receptacle, combined with the bearing-claws pivoted on opposite sides of said frame, the stops beneath said claws to sustain them in either position, the levers pivoted at their lower ends to said frame and connected at their upper ends and the links intermediate said levers and claws; substantially as set forth.

5. The box or receptacle consisting of the sides, ends and bottom having edge flanges which turn outward, combined with the bands H, I, independently riveted to the upper edges of said sides and ends and also riveted together and to said edge flanges by bolts L, and the bands M, N independently riveted to the lower edges of said sides and ends and the downwardly extending edges of said bottom by the rivets P, and also riveted together and to said edge flanges by rivets Q; substantially as set forth.

6. The box or receptacle consisting of the sides, ends and bottom, combined with the plates S riveted to said sides and carrying the trunnions T, the truck having an open end adapted to pass upon opposite sides of the receptacle, and levers connected with the truck to engage and lift said trunnions; substantially as and for the purposes set forth.

Signed at New York, in the county of New York and State of New York, this 26th day of November, A. D. 1892.

GEORGE VAN WAGENEN.

Witnesses:
　CHAS. C. GILL,
　ED. D. MILLER.